United States Patent [19]
Clark

[11] 3,717,179
[45] Feb. 20, 1973

[54] SOLENOID OPERATED VALVE
[75] Inventor: Richard J. Clark, Sarasota, Fla.
[73] Assignee: Rex Chainbelt Inc.
[22] Filed: April 29, 1971
[21] Appl. No.: 138,709

[52] U.S. Cl. ............. 137/625.65, 251/129, 339/204, 339/210
[51] Int. Cl. ........................... F16k 11/00, H01f 7/08
[58] Field of Search....... 137/625.65, 625.64, 596.17; 335/255; 339/26, 204, 206, 207, 208, 210, 248; 251/129

[56] References Cited

UNITED STATES PATENTS

| | | |
|---|---|---|
| 3,073,345 | 1/1963 | Hagler.............................137/625.65 |
| 3,117,594 | 1/1964 | Gordon............................137/625.65 |
| 2,930,947 | 3/1960 | Miller et al.........................335/255 |
| 3,626,342 | 12/1971 | Green............................251/129 X |

*Primary Examiner*—Henry T. Klinksiek
*Assistant Examiner*—Robert J. Miller
*Attorney*—Hofgren, Wegner, Allen, Stellman & McCord

[57] ABSTRACT

A solenoid operated valve having plug-in electrical connections wherein a solenoid positioned at an end of the valve body for controlling the valve spool has electrical connection pins extending into plug means positioned in the valve body. The plug means also receive electrical connection pins extending from a wiring box associated with the valve body.

7 Claims, 5 Drawing Figures

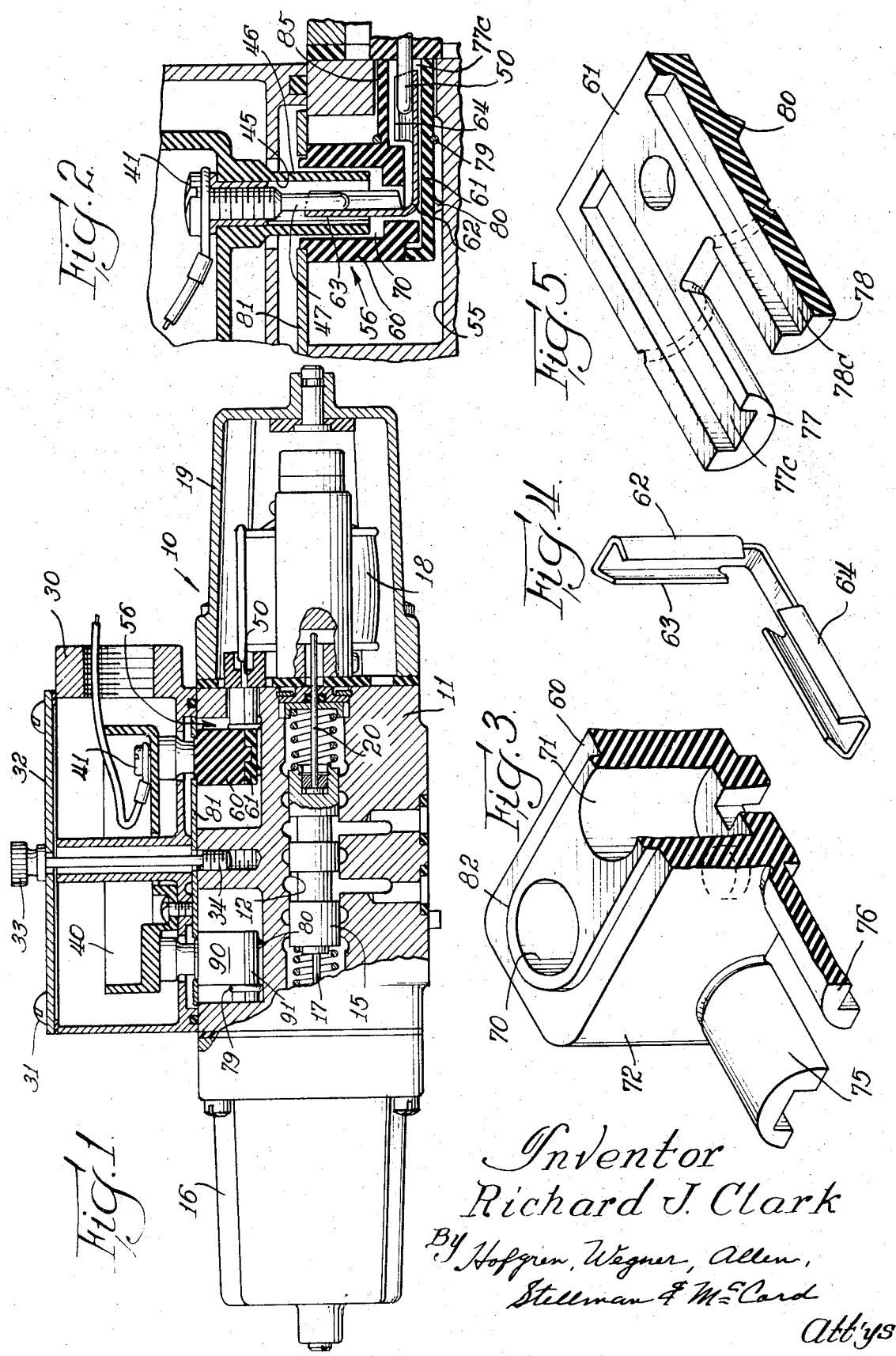

SOLENOID OPERATED VALVE

BACKGROUND OF THE INVENTION

This invention pertains to solenoid operated valves and more particularly to such a valve having plug-in electrical connections for the controlling solenoids and associated wiring box.

Illustrative of the prior art is U.S. Pat. No. 2,930,947 which discloses a solenoid operated valve wherein a pair of solenoids are associated with a valve spool to control the position thereof. The form of electrical wiring associated with the solenoid requires the disassembly of the valve for access to the ends of the leads for disconnecting thereof when a solenoid is to be replaced.

Valves normally have a long useful life and a malfunction normally is attributable to the electrical components associated with the valve. This could be a malfunctioning solenoid and in order to avoid lengthy downtime for the machine with which the valve is associated, it is desirable to make a quick interchange of solenoids. This is accomplished, as disclosed herein, by structure associated with the valve body including a nonconducting plug housing socket means to receive electrical connection pins extending from a solenoid whereby the interconnection is made by a simple plug-in operation.

Additionally, a plug-in connection for a wiring box associated with the solenoid valve is provided to permit easy interchange of a valve with a wiring box which is wired into a circuit at a piece of equipment having the valve.

SUMMARY OF THE INVENTION

An object of the invention is to provide a new and improved solenoid operated valve having plug-in electrical connections for an operating solenoid permitting fast solenoid replacement without dismantling of the valve.

Still another object of the invention is to provide a solenoid operated valve with plug-in electrical connections for both an operating solenoid and also a wiring box associated with the valve body whereby a valve can be replaced or a solenoid can be replaced with simple plug-in electrical connections.

Still another object of the invention is to provide a solenoid valve with plug-in electrical connections, comprising a valve body with a central bore and a valve spool movably positioned therein with a solenoid positioned at one end of the body, a wiring box positioned on top of the body, and plug means in the body for removably receiving electrical connection pins extending from both the solenoid and the wiring box with said plug means including a non-conducting casing having aperatures for receiving the connection pins and having electrically conducting socket means disposed within the casing for electrically interconnecting the connection pins of the solenoid and wiring box.

BRIEF DESCRIPTION OF THE DRAWING

FIG. 1 is a front elevational view of the solenoid operated valve with parts broken away to show part of the structure on a central sectional line;

FIG. 2 is an enlarged view of the plug-in electrical connection shown in the upper part of FIG. 1 and on an enlarged scale;

FIG. 3 is a fragmentary perspective view of an upper casing part of the electrical connection plug;

FIG. 4 is a perspective view of a conducting socket; and

FIG. 5 is a perspective fragmentary view of a lower casing part of the electrical connection plug.

DESCRIPTION OF THE PREFERRED EMBODIMENT

The solenoid operated valve is indicated generally at 10 and is shown in FIG. 1. This general construction is similar to that shown in Miller et al. U.S. Pat. No. 2,930,947. The valve has a body 11 with a bore 12 which movably receives a spool 15 which coacts with a series of ports in the valve body. The valve spool 15 is positioned by a pair of solenoids with one solenoid being disposed in a casing 16 at one end of the body and having a push-pin 17 engaged with valve spool 15. The solenoid disposed within the casing 16 is the same as a solenoid 18 disposed within a casing 19 and positioned at the opposite end of the valve body 11. The solenoid 18 has an armature which coacts with a push-pin 20. As shown, the valve spool 15 is spring centered and will be in a centered position when neither of the solenoids is energized. When a solenoid is energized, the valve spool 15 is shifted from its center position to correspondingly control hydraulic fluid flow through the valve. This general construction is shown in the aforesaid patent and reference may be made thereto for a more detailed description of the general structure.

A plug-in wiring box 30 is held in position on top of valve body 11 by thumb screw 33 threaded into the valve body as indicated at 34. The wiring box has a removable cover 32 fastened to the wiring box 30 by a series of screws 31. A terminal carrier 40 mounted within the wiring box 30 carries a series of terminals, one of which is indicated at 41 in FIGS. 1 and 2. With there being a pair of electrical leads for the solenoid 18, there are a pair of terminals 41 of the same construction which extend downwardly through a passage 45 formed in a tubular extension 46 of the terminal carrier 40. Each of the terminals 41 has an electrical connection pin 47 which is of a length to extend beneath the level of the wiring box 30.

The solenoid 18 has a pair of electrical leads each of which terminate in a free end with an electrical connection pin, one of these being indicated at 50, and extending beyond the solenoid housing 19 and into a cavity 55 in the valve body 11.

The cavity 55 mounts electrically conducting means in the form of a plug for interconnecting the connection pins 47 of the wiring box terminals 41 with the connection pins 50 from the solenoid 18. This plug, indicated generally at 56, comprises a two-part casing of a plastic nonconducting material such as Delrin. An upper casing part 60 interfits with a lower casing part 61 shown in FIGS. 3 and 5, respectively, and with socket means in the form of a pair of connecting socket members 62, one of which is shown in FIG. 4, mounted within the assembled casing parts.

The connecting pins 47 and 50 extend at right angles to each other and the conducting socket members 62 are therefore formed as an L-shape and each has an upper pin gripping section 63 and a lower pin gripping section 64. The upper pin gripping section 63 of two socket members are mounted in vertical recesses 70 and 71 formed in a base part 72 of the upper casing part 60. The lower pin gripping sections 64 of the socket members extend outwardly in recesses which are formed by interfitting of semi-circular casing extensions 75 and 76 of the upper casing part 60 and semi-circular extensions 77 and 78 of the lower casing part 61. The casing parts 60 and 61 are separable to permit mounting of the conducting socket members 62 and, after placement of these sockets in the upper casing part 60, the lower casing part 61 can be brought into assembled relation. A pair of retaining rings, one of which is shown at 79 (FIG. 2), fit in recesses at the base of casing extension 75-78 to hold the casing parts in assembled relation. The upper and lower casing part extensions, when assembled, define a pair of open-ended channels 77C and 78C to receive the solenoid connection pins 50.

The assembled casing is then fitted into the cavity 55 of the valve body with downward projections 80 on the lower casing part 61 engaging a wall of the cavity. The plug casing is held in position by a cover plate 81 for the valve body and by casing extensions 75-78 protruding out through a lateral opening 85 in the valve body. The cover plate 81 is provided with an opening of a size to receive a raised flange 82 on the top of the casing base part 72. Following attachment of the cover plate 81, the wiring box can then be assembled to the valve body. The connection pins 47 are inserted into the upper pin gripping sections 63 of the socket members to complete the electrical connection to the solenoid leads. The terminal carrier 40 is also formed of a material such as Delrin to avoid any electrical contact by the tubular extensions 46.

The structure associated with the solenoid positioned in the solenoid cover 16 is the same as that described with a plug casing having an upper part 90 and a lower part 91 similar to the parts 60 and 61 of the plug casing 56 for the solenoid 18.

Frequently, work rules require an electrician when making electrical disconnections. With the structure disclosed herein it is possible for a simple solenoid replacement to be made without calling an electrician. After removal of the solenoid cover 19 for access to the solenoid 18, the solenoid is removed easily by withdrawal of the connection pins 50 from the plug. These steps are reversed for the mounting of a new solenoid.

In the event that a malfunction occurs in the valve, it is possible to interchange a valve without disturbing the wiring box 30. The wiring box and valve body can be quickly disassociated by loosening the thumb screw 33 and pulling upward on the wiring box thereby breaking the electrical connection at the junction of the connection pins 47 and socket members 62.

I claim:

1. A solenoid operated valve having plug-in electrical connections comprising, a valve body with a central bore, a valve spool in said bore, a solenoid positioned at one end of said body, means extending between the solenoid and said valve spool whereby the solenoid controls the position of said spool, electrically conducting means in said body for removably receiving electrical connection pins extending from said solenoid, and a wiring box secured to said body, said conducting means also receiving electrical connection pins extending from said box.

2. A valve as defined in claim 1 wherein said conducting means comprises a nonconducting casing with electrically conducting members positioned therein to receive said pins.

3. A valve as defined in claim 2 wherein said casing is plastic and fitted into a cavity in said valve body, and a cover plate for said valve body which engages and holds said plastic casing positioned in the body.

4. A solenoid operated valve having plug-in electrical connections comprising, a valve body with a central bore, a valve spool in said bore, a solenoid positioned at one end of said body, means extending between the solenoid and said valve spool whereby the solenoid controls the position of said spool, a wiring box secured to said body, electrical connection pins extending from said wiring box and from said solenoid, and electrically conducting means in said body for removably receiving said pins including a nonconducting casing having a plurality of access openings for said pins, and conducting socket members positioned in said casing to receive and electrically connect said pins.

5. A valve as defined in claim 4 wherein said casing has an upper part and a lower part separable to permit mounting of an L-shaped conducting socket member therein.

6. A valve as defined in claim 4 wherein a cover plate for the body engages said casing to hold the casing in operative position.

7. A valve as defined in claim 1 wherein said electrically conducting means comprises a plug with a nonconducting plastic casing positioned in said body and having conducting socket members positioned therein with access thereto for receiving said connection pins, said casing being formed of an upper part and a lower part which are separable to permit mounting of the socket members therein, and means for holding said casing parts in assembled relation.

* * * * *